(12) United States Patent
Teixeira

(10) Patent No.: US 7,867,759 B2
(45) Date of Patent: *Jan. 11, 2011

(54) MOBILE MODULAR, MULTI-CHAMBER COMPOSTING SYSTEM

(76) Inventor: Roger Teixeira, 2575 County St., Dighton, MA (US) 02715

(*) Notice: Subject to any disclaimer, the term of this patent is extended or adjusted under 35 U.S.C. 154(b) by 0 days.

This patent is subject to a terminal disclaimer.

(21) Appl. No.: 12/463,661

(22) Filed: May 11, 2009

(65) Prior Publication Data

US 2009/0221063 A1   Sep. 3, 2009

Related U.S. Application Data

(63) Continuation of application No. 11/520,994, filed on Sep. 15, 2006, now Pat. No. 7,550,292.

(51) Int. Cl.
*C12M 1/00* (2006.01)
(52) U.S. Cl. ................. 435/290.1; 435/290.4
(58) Field of Classification Search ............ 435/290.3, 435/291.2, 290.4, 290.1
See application file for complete search history.

(56) References Cited

U.S. PATENT DOCUMENTS

| | | | | |
|---|---|---|---|---|
| 5,139,554 A | * | 8/1992 | Johnson | 71/9 |
| 5,312,754 A | * | 5/1994 | Bryan-Brown | 435/286.6 |
| 6,482,627 B1 | * | 11/2002 | Dahlstrom | 435/290.2 |
| 7,550,292 B2 | * | 6/2009 | Teixeira | 435/290.1 |
| 2007/0200382 A1 | * | 8/2007 | Reuser et al. | 296/24.31 |

* cited by examiner

Primary Examiner—William H Beisner
Assistant Examiner—Danielle Henkel
(74) Attorney, Agent, or Firm—Rajesh Vallabh; Foley Hoag LLP

(57) ABSTRACT

A mobile, modular multi-chamber composting system for the composting of organic material includes a composting unit having a pair of adjacent composting chambers enclosed by sidewalls, a roof, and closure panels, with the chambers delimited by a separation panel, and the first chamber having a uni-directional tilting floor and the second chamber having a bi-directional tilting floor so that organic material can be placed in the first chamber and transferred to the second chamber to facilitate decomposition of the material. Hydraulic mechanisms are interconnected to each floor to facilitate the tilting of the floor and the transference of the material, and the second chamber can transfer the material back to the first chamber or expel the material from the unit or transfer the material to another adjoined composting unit. The composting units are stackable one atop another, and the composting units are towable by a lawn tractor, a vehicle, or can be configured as an industrial-sized system towable by a tractor-trailer.

17 Claims, 13 Drawing Sheets

MOBILE MODULAR, MULTI-CHAMBER COMPOSTING SYSTEM

CROSS REFERENCE TO RELATED APPLICATION

This application is a continuation of U.S. patent application Ser. No. 11/520,994, filed on Sep. 15, 2006, hereby incorporated herein by reference.

FIELD OF THE INVENTION

The field of the invention pertains to aerobic composting units and systems, and more particularly pertains to a mobile, modular, multi-chamber composting system that is portable, towable and stackable for creating two or multi-chamber systems.

BACKGROUND OF THE INVENTION

Composting is a natural decaying process in which organic material such as leaves, grass clippings, sticks, limbs, food detritus, animal waste, straw, and hay are converted into humus by naturally occurring microorganisms. Leaves and grass clippings are especially desirable products as leaves contain large amounts of carbon and grass contains large amounts of nitrogen—both of which are essential elements for fostering healthy and robust plant growth.

Composting is a fairly easy process that involves gathering the above-cited products and soil, which contains the microorganisms, into a large pile and then simply allowing the microorganisms to naturally decompose the organic material. One by-product of this process is heat energy, and as the process continues, the dissipation of waste heat creates a warm, seething environment within the pile that both stimulates the production of more microorganisms and furthers the decomposition process along thereby creating nutrient-rich humus.

Several factors are determinative of the quality of the humus produced through the composting process. While a compost pile can be started in one's backyard, beside a garden or adjacent a supply shed or barn, careful attention should be given to the location of the compost pile. Outdoor compost piles run the risk of being vitiated by inclement weather, especially by wet and rainy weather. In addition, outdoor compost piles can easily become the target of various rodents and scavengers. Furthermore, the primary problem with composting for any scale of operation is the odor emitted by the pile. Also, the leakage or leachate (a watery by-product of composting) must be contained and controlled to meet numerous local and state environmental regulations. Moreover, without daily monitoring, extraneous elements, such as debris and garbage carried by the wind, can find their way into the compost pile and degrade and impair the process of decomposition or the quality of the humus produced. In addition, the pile (notwithstanding the location) should be periodically turned over thereby exposing all of the compost pile to ambient oxygen and preventing any part or portion of the pile from becoming moisture-saturated—a condition that impedes and prevents the circulation of air within the pile and greatly diminishes the decomposition process. For simple backyard compost piles, the periodic turning can be accomplished by a shovel or pitchfork. However, for larger piles, other, usually mechanical means are required as the compost pile becomes too compact and heavy for manual turning over. Thus, the prior art discloses a variety of composting methods and devices to overcome the above problems and produce high quality humus.

For example, the H. T. Cobey patent (U.S. Pat. No. 3,369,797) discloses an apparatus that includes a straddling frame for periodically turning compost and then depositing the compost in windrows for further processing.

The H. T. Cobey patent (U.S. Pat. No. 3,606,265) discloses a fragmentizing apparatus with a vertically mounted drum that rotates about a vertical axis, with the drum including shearing projections, such as teeth, that pulverize agricultural material fed to the apparatus.

The Terry patent (U.S. Pat. No. 4,042,219) discloses a rotatable drum having a cylindrical internal space and extending through the internal space is a shaft having vanes so that as material enters the internal space through apertures on the drum surface, the material strikes the vanes so that after several drum revolutions organic waste material is converted into compost.

The Wilson patent (U.S. Pat. No. 4,060,945) discloses an improved compost bin that has a perforated tunnel member formed immediately beneath the compost bin so that air can freely circulate from the tunnel member to the bin thereby providing continuous air circulation and enhancing the rate of decomposition and the quality of the composted material.

The Roman patent (U.S. Pat. No. 4,396,292) discloses a windrow-type composting apparatus that includes a frame supported by a plurality of drive wheels, and elongate paddles mounted to the frame for confronting a row of biodegradable material and progressively moving the material to an adjacent row.

The Long patent (U.S. Pat. No. 5,190,572) discloses a composting method and device that includes a plurality of rectangular-shaped stackable sub units with each sub unit comprising four interlocking double walled plastic panels.

The Shain patent (U.S. Pat. No. 5,429,945) discloses a composter that includes a hollow container having apertures arranged thereon for the circulation there through of air and moisture, and an upper cone and a lower cone, both of which have apertures thereon, wherein the upper cone gravitationally descends toward the lower cone as the volume of organic matter is reduced through decomposition thereby enhancing the efficient decomposition of the organic matter.

Nonetheless, despite the ingenuity of the above devices, there remains a need for an easily portable and towable composting system wherein the organic material can be mechanically transferred between decomposition chambers for enhancing the creation of the composted material, and which can accommodate electronic monitoring equipment and can be sized to accommodate various markets.

SUMMARY OF THE INVENTION

The present invention comprehends a mobile, modular multi-chamber composting system for decomposing organic material in settings ranging from residential backyard gardens and farms of all sizes to industrial sites and facilities that can include food processing concerns, governmental centers, and military facilities. The composting system is designed for compact storage and ease of use, and the composting system includes individual composting units that can be stacked on top of each other or joined together to form an industrial size composting system. The composting system can be designed and sized for uses ranging from small-size use and towing by a lawn tractor, medium-size use and towing by a vehicle such as a small pickup truck, and large scale, industrial size use and towing by a tractor-trailer. The composting units are also adapted for lifting by a forklift for loading and transport on a flat bed, and for stacking multiple composting units in a stackable configuration.

The mobile, modular composting system includes at least one towable and portable composting unit or multi-chamber unit. More specifically, the multi-chamber composting unit includes a first or initial chamber and a second or adjoining chamber with the chambers delimited and defined by a separation panel. The chambers are defined by sidewalls, a removable roof and removable end panels In addition, each chamber includes a composting floor, and each floor includes a centrally located aeration aperture that allows for air to be forced into the chambers and extracted therefrom during the composting process thereby providing for proper aeration of the material. The floor of each chamber is also removable and each floor is interconnected to a separate lifting mechanism. The lifting mechanisms can be mounted to the sidewalls or can be located in sub compartments that extend the length of each floor and are immediately subjacent thereto. Moreover, a blower or fan can be positioned in this sub chamber for forcing air into the material or extracting air therefrom. In addition, a second sub compartment or chamber that is coextensive with each sub chamber immediately subjacent the respective sub chambers can be used to house electronics for environmental monitoring of the organic material. Also, a natural chimney can be created in each chamber by first placing a vertical tube or conduit within the chamber and with its lower end in registration with the aeration aperture. Organic material would then be deposited within the chamber and would gradually compact about the tube. Horizontally disposed pipes could also be inserted through the sidewalls and into the compacted organic material with their respective openings abutting the tube. Within a day or two of the filling of the chamber the tube is removed thereby forming a natural chimney that provides an enlarged internal surface area for the organic material and also provides air flow to the horizontally disposed pipes that now directly register with the natural chimney.

One manner of use would be to tow the composting unit to the site where the organic material is located. After packing the initial chamber with organic material, the composting system can be brought to a processing facility and placed in a stackable configuration with other composting units or left at the site for at least two weeks to allow for the digestion process to take place. The solid organic material is composted in the initial chamber and then flipped into the second—adjoining—chamber using the lifting mechanism that is preferably hydraulically powered, either manually driven or automated hydraulics. The aeration apertures on the floors of the chambers encourage proper aeration throughout the organic material. Because the floor of the second chamber is able to bi-directionally tilt, the second chamber can either return the organic material to the initial chamber or, after the removal of the end panel, expel the material from the second chamber; or transfer the material to the initial chamber of an attached composting unit. Sensors mounted to the floors or sidewalls of both chambers, and interconnected to a microprocessor, are used to monitor environmental conditions and parameters occurring within the chambers, and in the organic material, with such parameters including ph level, temperature, gaseous condition, and moisture. The sensors alert the user or operator when intervention needs to be undertaken to maintain the appropriate digestion conditions and furtherance of the digestion process.

It is an objective of the present invention to provide a mobile, modular multi-chamber composting system in which at least one chamber is capable of bi-directionally flipping or turning the organic material to facilitate decomposition.

It is another objective of the present invention to provide a mobile, modular multi-chamber composting system that includes compartments and capabilities for a shaker and for electronic monitoring equipment.

It is yet another objective of the present invention to provide a mobile, modular multi-chamber composting system that uses microprocessors to monitor critical parameters pertaining to the decomposition of the organic material.

It is still yet another objective of the present invention to provide a mobile, modular multi-chamber composting system that is capable of being towed on a trailer.

Another objective of the present invention is to provide a mobile, modular multi-chamber composting system that is capable of being lifted by a forklift for stacking of several composting chambers one upon another.

Yet another objective of the present invention is to provide a mobile, modular multi-chamber composting system wherein several composting chambers can include tubing or conduit that allows for air flow from one chamber to an adjoined chamber.

Yet still another objective of the present invention is to provide a mobile, modular multi-chamber composting system wherein natural chimneys can be created in each composting chamber and when two or more composting chambers are disposed in a stacked configuration, the natural chimneys are aligned.

A still further objective of the present invention is to provide a mobile, modular multi-chamber composting system that includes fans or blowers disposed in a sub chamber for forcing air in or extracting air out of the composting chamber to effectuate the efficient decomposition of the organic material contained within the composting chambers.

A yet still further objective of the present invention is to provide a mobile, modular multi-chamber composting system that can accommodate various markets ranging from household uses to industrial uses.

Still yet another objective of the present invention is to provide a mobile, modular multi-chamber composting system that allows for the real time electronic monitoring of certain parameters pertaining to material decomposition.

Still yet a further objective of the present invention is to provide a mobile, modular multi-chamber composting system that includes sidewalls that contain odor, prevent scavengers from entering the chambers, and are durable and easily cleaned.

Still another objective of the present invention is to provide a mobile, modular multi-chamber composting system wherein leakage and leachate are contained and controlled to meet various environmental regulations.

These and other objects, features and advantages will become apparent to those skilled in the art upon a perusal of the following detailed description read in conjunction with the accompanying drawing figures and appended claims.

DETAILED DESCRIPTION OF THE PREFERRED EMBODIMENT

Illustrated in FIGS. 1-19 is a portable, towable and stackable mobile, modular multi-chamber composting system 10 for decomposing organic material 12 into valuable nutrient-rich humus and which is adaptable and configurable for low end, middle and high end markets. Thus, homeowners, farmers, the lawn and garden industry, the specialty produce industry, as well as large facilities such as food manufacturing and processing centers, military and governmental institutions and large-scale composting companies can use the composting system 10 of the present invention. The composting system 10 is configurable as a stand alone unit, and can be stacked atop other composting systems 10 or joined with other composting systems 10 for creating a large scale composting system that serves, for example, a metropolitan area and can provide a huge through put of composted material. The composting system 10 of the present invention, in its various configurations, addresses the issues of landfills reaching their capacity and overflowing, and government initiatives and directives aimed at avoiding such problems and working to reduce them.

Figure 11:
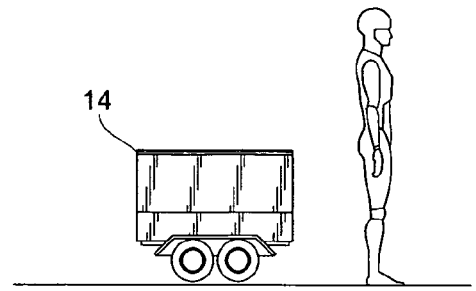
FIG. 11 is a side elevational view of the mobile, modular multi-chamber composting system of the present invention illustrating a small size unit for towing by a lawn tractor.
Figure 12:
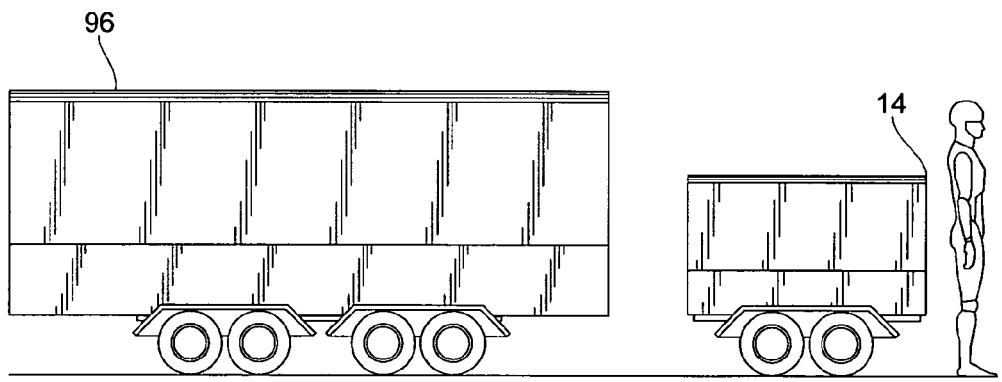
FIG. 12 is a side elevational view of the mobile, modular multi-chamber composting system of the present invention illustrating mid-size composting units for towing by a car or truck.
Figure 13:
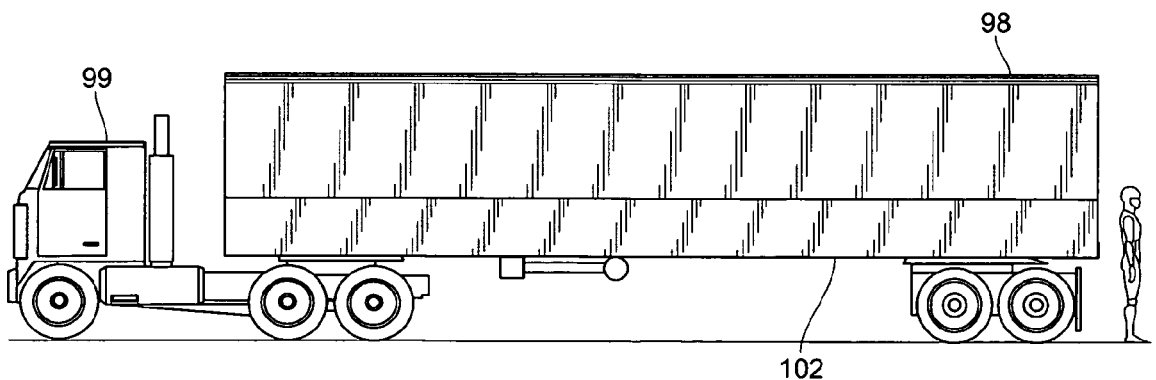
FIG. 13 is a side elevational view of the mobile, modular multi-chamber composting system of the present invention illustrating an industrial-sized composting system for towing by a tractor-trailer.

Thus, illustrated in FIGS. 1-13 and 18 and 19 is a representative composting system 10 with the composting system 10 scaled to small, middle and large size markets as shown in FIGS. 11-13, and which will be hereinafter further described. The composting system 10 is comprised of an individual composting unit 14, and a number of composting units 14 can be configured in a stackable arrangement as shown in FIG. 5 or can be configured and connected in a serial arrangement as shown in FIG. 3. Each composting unit 14 includes a pair of adjacent digestion and decomposition chambers capable of receiving and holding therein the organic material for digestion, decomposition and composting therein. The chambers are more specifically defined as a first or initial chamber 16 and a second or adjoining chamber 18. The first or initial chamber 16 is configured for unidirectional tilting for flipping of the organic material 12 while the second or adjoining chamber 18 is capable of bi-directional tilting for flipping of the organic material 12. Thus, the first chamber 16 is capable of transferring the organic material 12 to the second chamber 18 for enhancing the decomposition process, while the second chamber 18 is capable of both transferring the organic material 12 back to the first chamber 16, or the second chamber 18 can transfer the organic material 12 to an adjoined composting unit 14, as shown in FIG. 3, or the second chamber 18 can completely expel the organic material 12 from the composting unit 14.

Opposed sidewalls 20 and end or closure panels 22 define the first or initial chamber 16 and the second or adjoining chamber 18 and enclose both chambers 16 and 18. The end panels 22 are slidably insertable and securable to the opposed ends 24 of the sidewalls 20 by the simple rail or channel system, and are easily removable for cleaning and gaining access to the chambers 16 and 18. Both the walls 20 and the end panels 22 are insulated to contain heat. A preferred embodiment for the rail system includes vertically extending channels or grooves 26 located on the inside surfaces at the opposed ends 24 of both sidewalls 20. As shown in FIGS. 1-4b and 10-13, a lightweight, durable roof 28 is removably mountable to the upper portions of the sidewalls 20 and the upper ends of the end panels 22 for closing and sealing off the chambers 16 and 18 in an airtight and watertight manner. Thus, the sealable composting system 10 is created when the end panels 22 are mounted to the opposed ends 24 of the sidewalls 20 and the roof 28 is placed upon the upper portions of the sidewalls 20. In addition, the chambers 16 and 18 are delimited by a separation panel 30 that is removably mountable between the chambers 16 and 18 for dividing the chambers 16 and 18.

Figure 2:
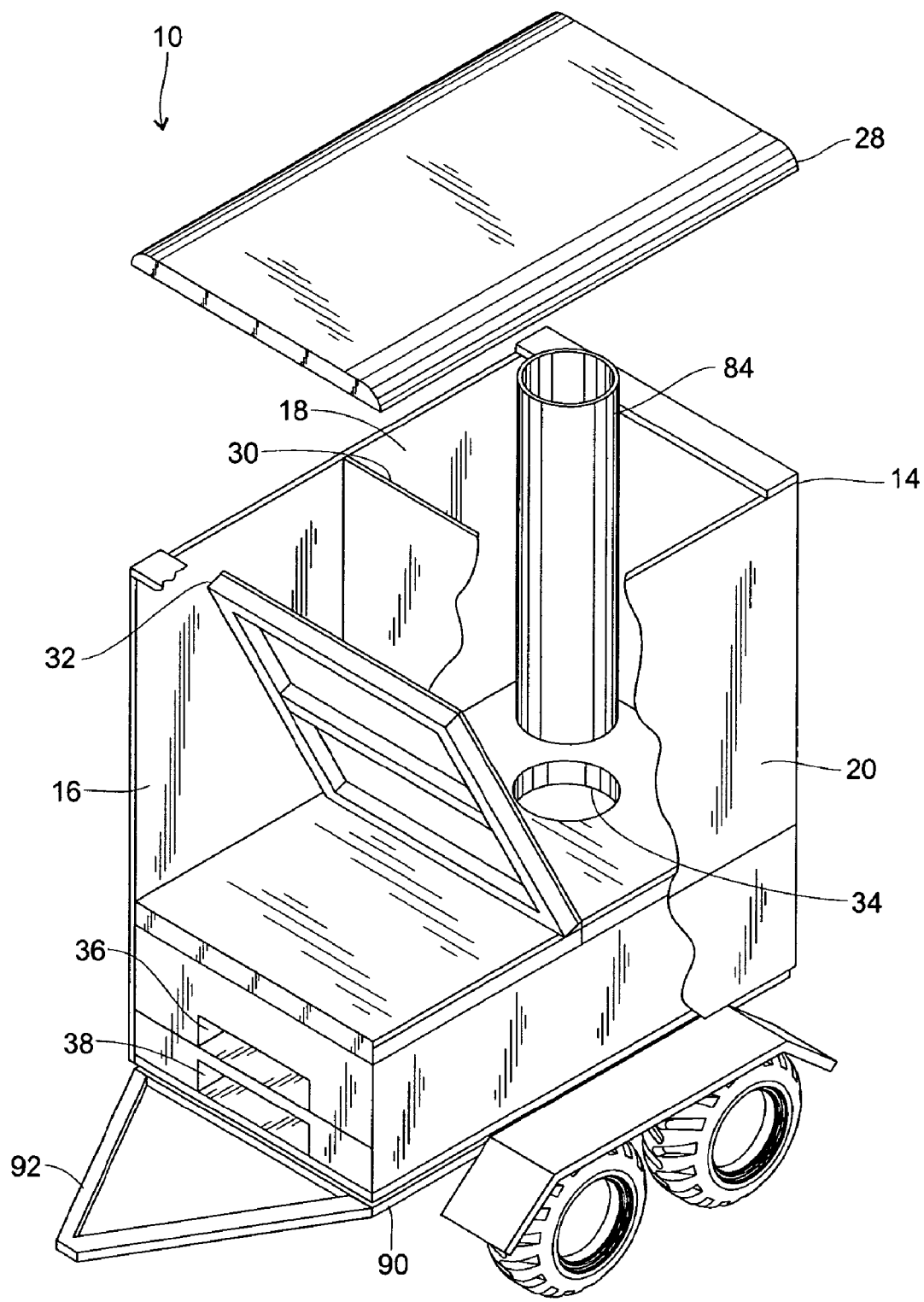
FIG. 2 is a perspective view of the mobile, modular multi-chamber composting system of the present invention illustrating the tilting of one composting floor and the placement of a temporary tube in a second chamber of one composting unit for creating a natural chimney therein after the tube has been withdrawn.
Figure 3:
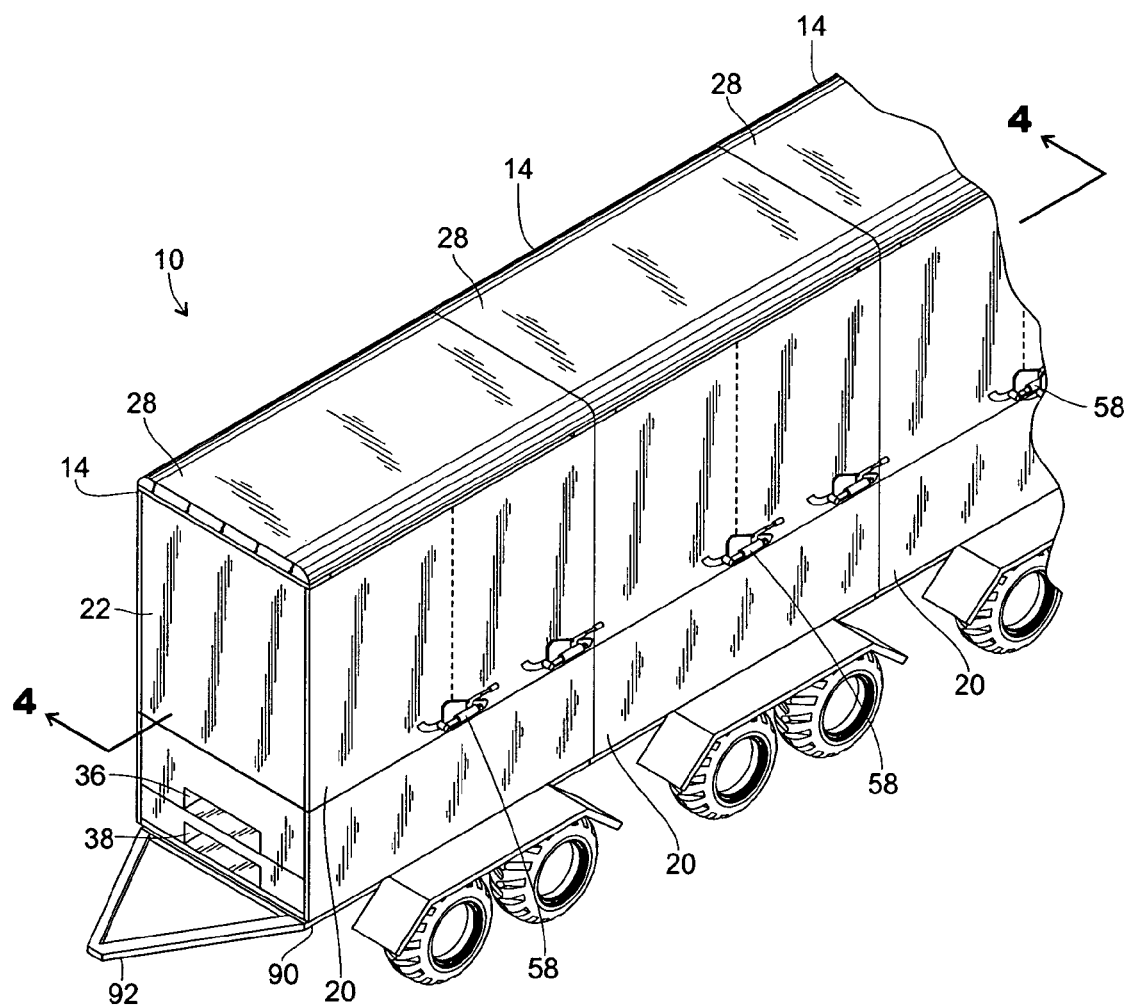
FIG. 3 is a perspective view of the mobile, modular multi-chamber composting system of the present invention illustrating the interconnection of several composting units in a towable and mobile configuration.
Figure 14:
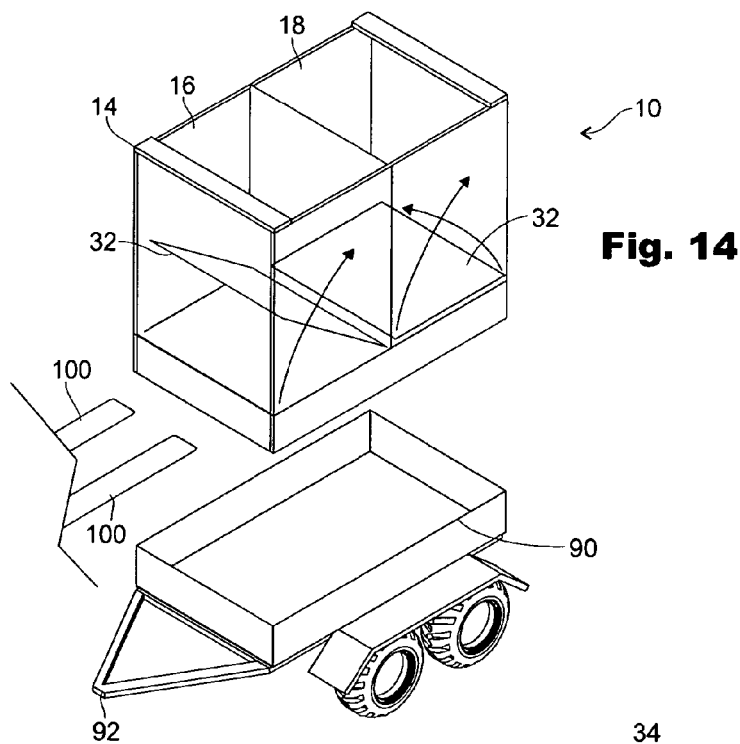
FIG. 14 is a perspective view of the mobile, modular multi-chamber composting system of the present invention illustrating the lifting of the composting unit by a forklift for stacking or storage and the bi-directional tilting of at least one composting floor.
Figure 15:
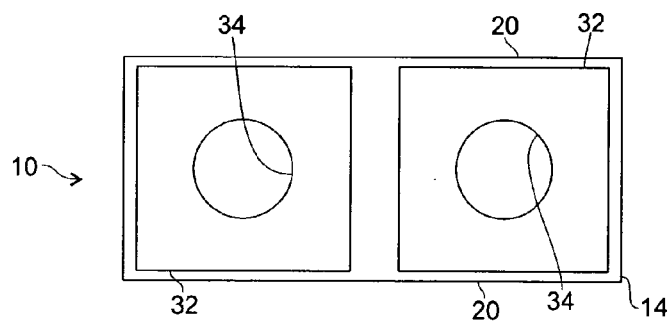
FIG. 15 is a top plan view of the mobile, modular multi-chamber composting system of the present invention illustrating the aeration apertures formed on the separate floors of each chamber of one composting unit.
Figure 16:
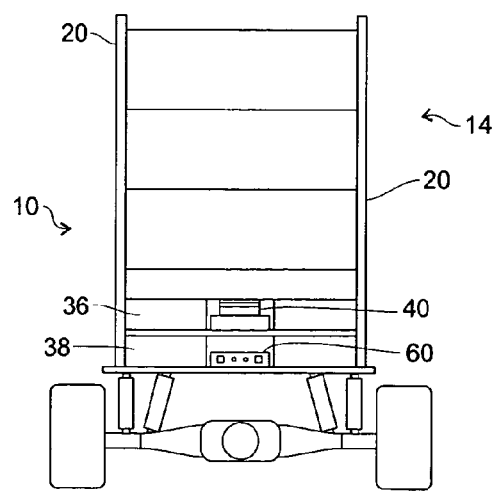
FIG. 16 is a rear elevational view of the mobile, modular multi-chamber composting system of the present invention illustrating the two sub compartments beneath the floor that can hold the hydraulics, the electronics and the blower/fan.

As shown in FIGS. 2, 4a, 4b, 6, 8, 14, 15, 16 and 19, each chamber 16 and 18 includes a material supporting floor or composting floor or platform 32 that is capable of being raised and tilted for transferring or expelling the organic material 12 supported thereon by, preferably, a hydraulic lifting means hereinafter further described. More particularly, the composting floor 32 for the first chamber 16 is configured for unidirectional movement (movement in only one direction) and tilting as shown in FIGS. 2 and 14 and the composting floor 32 for the second chamber 18 is capable of bi-directional movement (movement in two directions) and tilting as shown in FIG. 14. Each composting floor 32 includes a centrally located aeration aperture 34 that allows for air flow within the chambers 16 and 18 or the extraction of air therefrom so that proper aeration of the organic material 12 is maintained. The composting floors 32 are also removable for cleaning and access to other elements hereinafter further described. The aeration apertures 34 also assist in creating natural chimneys within the chambers 16 and 18 and extending up through the mass of organic material 12 composting in either chamber 16 or 18 so that a larger surface area of the organic material 12 is exposed for aeration through continuous contact with air flowing through the natural chimney. The roof 28, the sidewalls 20, the separation panels 30, the composting floors 32 and the end panels 22 are preferably manufactured from a lightweight, durable plastic for ease of transport, storage, removal and cleaning.

As illustrated in FIGS. 1-4b, 16, 18 and 19 located below the composting floors 32 are one—and preferably two—subjacent storage chambers that extend the length of both composting floors 32 and which are coequal in length but can be smaller in overall area. The subjacent storage chambers are further defined by a first subjacent storage chamber 36 that would hold the hydraulic lifting means primarily used for the composting system 10 when adapted for small and mid-size use; and a second subjacent storage chamber 38 where electronics for environmental monitoring of the organic material 12 would be stored. A blower or fan 40 to provide for air flow up into the chambers 16 and 18 can also sit within the first subjacent storage chamber 36. The blower or fan 40 can be used to force air into or extract air from the chambers 16 and 18 and to force air to circulate about and through the organic material 12 during the decomposition process to assist in the process. The blower or fan 40 would be located adjacent the respective aeration aperture 34 for efficiently directing air into the respective chamber 16 or 18. The first storage chamber 36 can also serve as a plenum for creating either positive or negative air pressure to force air into the chambers 16 and 18 or extract air therefrom. Access to both subjacent storage chambers 36 and 38 is facilitated by the removal of one or both of the composting floors 32.

Illustrated in FIGS. 1, 3 and 6-10 is a preferred embodiment for a lifting and tilting means for lifting and tilting the composting floors for transferring the organic material 12 between chambers 16 and 18 or to another composting unit 14; or expelling entirely the organic material 12. FIGS. 1, 3 and 6-10 disclose a pair of hydraulic lifting mechanisms 58 that are mounted to both sidewalls 20 and are interconnected to the respective composting floors 32 for selectively lifting and tilting the composting floors 32. The hydraulic mechanisms of FIGS. 1, 3 and 6-10 are designed for mid size composting systems, and can be sized up for accommodating large-scale industrial composting systems.

Figure 17:
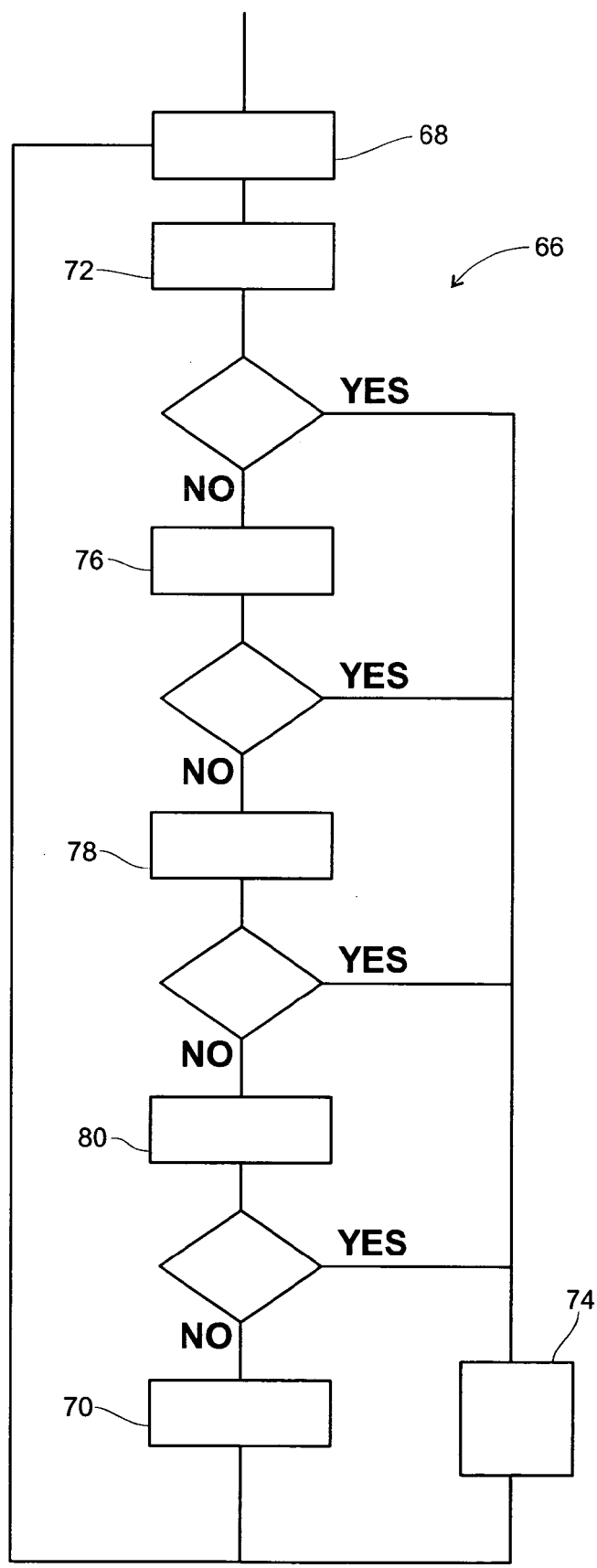
FIG. 17 is an electrical schematic of the mobile, modular multi-chamber composting system of the present invention illustrating the steps undertaken by the microprocessor in monitoring various parameters pertaining to material decomposition such as temperature, moisture level, ph level, and gaseous condition.

Illustrated in FIGS. 10 and 17-19 is electronics for the environmental monitoring of the organic material 12 composting within the chambers 16 and 18 throughout the entire decomposition process. A number of conditions or parameters can be monitored, and among the parameters are ph level, the gaseous condition within the organic material 12, the moisture level or content of the material 12, and the temperature of the organic material 12 or within the chambers 16 and 18. The electronic equipment 60 is preferably placed within the second storage chamber 38 and is electrically interconnected—either by wire or wirelessly—to a monitoring station or site. The electronic equipment 60 for monitoring the digestion chambers 16 and 18 data can include sensors 62 for each parameter or condition with the sensors 62 connected to a microprocessor 64 for accumulating and storing data monitored in the digestion chambers 16 and 18 for real time analysis and review. The monitoring can be done on site or off site. The flowchart 66 on FIG. 17 is a representative flowchart of the sequence of steps that can be undertaken in the monitoring process. Thus, first would be the deposition of the organic material 68 within the first or initial chamber 16 for decomposition, and then the decomposition process 70 would commence. If the ph level 72 exceeds a given value, intervention by the operator 74 occurs to remedy the problem; otherwise, monitoring of the other parameters—the gaseous condition 76 within the material 12, the temperature 78, and the moisture content 80—continues with operator intervention 74 capable of occurring at any point in the monitoring process. The sensors 62 can be mounted to or in the sidewalls 20 or the composting floors 32 for sensing the various conditions, and the microprocessor 64 can be housed in the second storage chamber 38 or can be in wireless electrical communication with the sensors 62.

Figure 18:
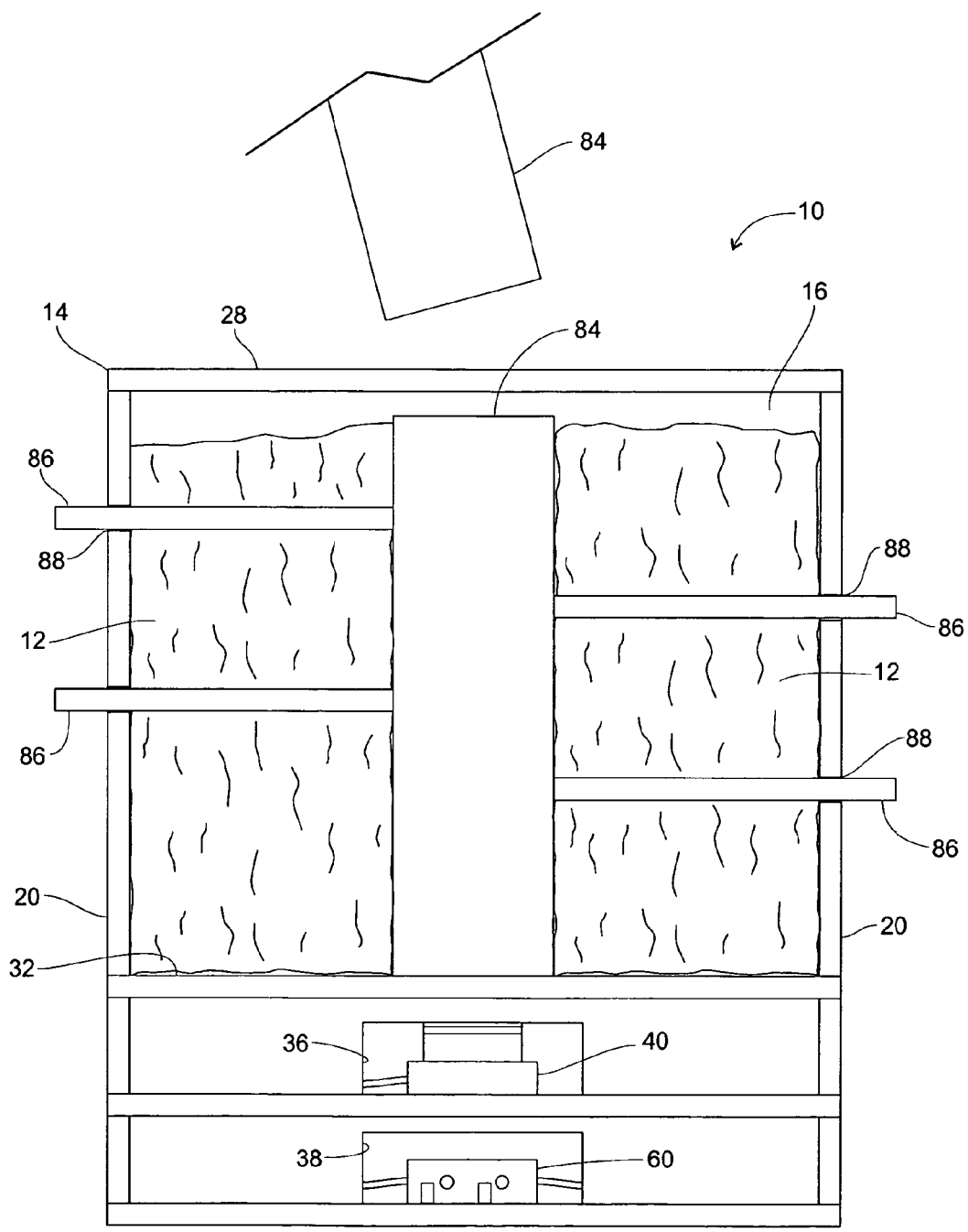
FIG. 18 is a rear elevational view of the mobile, modular multi-chamber composting system of the present invention illustrating the disposition of an optional blower/fan in one of the sub compartments for forcing air into or extracting air from the composting chambers and the insertion of several horizontal pipes into the organic material for registration with the tube that has been placed within the chamber.
Figure 19:
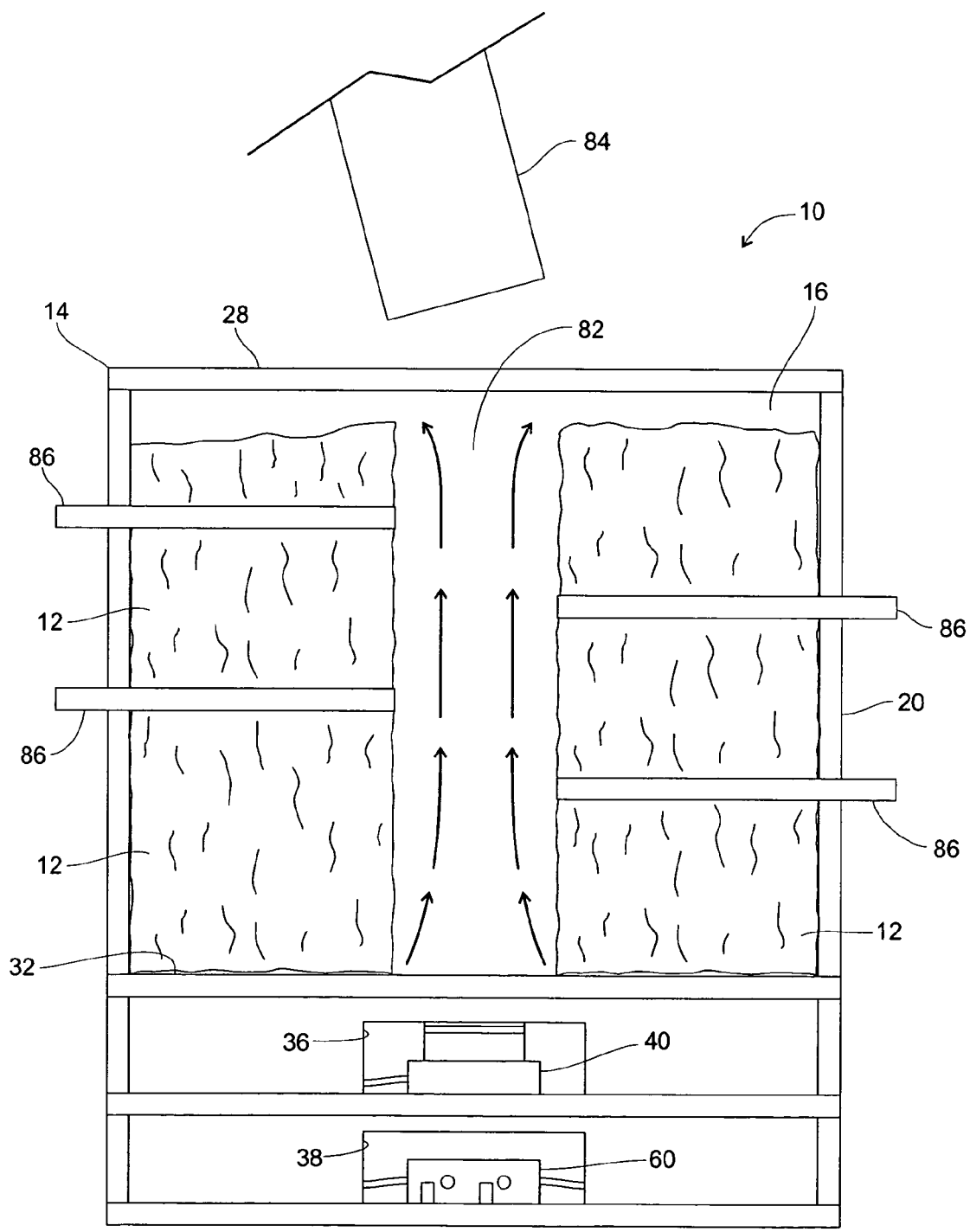
FIG. 19 is a rear elevational view of the mobile, modular multi-chamber composting system of the present invention illustrating the registration of the horizontal pipes with the natural chimney that is created after the tube is removed from the chamber.

In order to enhance the decomposition process, increase the surface area of the organic material 12 that is exposed to continuous aeration, and provide for a continuous air flow channel within and through the organic material 12, the composting system 10 includes a means to create a natural chimney within the chambers 16 and 18 and extending vertically through the mass of organic material 12. Thus, as shown in FIGS. 2, 4a, 4b, 5, 18 and 19 (the hydraulic mechanisms 58 have been omitted from FIGS. 18 and 19 for clarity), a natural chimney 82 is formed by first placing a tube or conduit 84 within the desired chamber 16 or 18 and in registration with the respective aeration aperture 34. The tube 84 will also be in air flow registration with at least the first sub chamber 36. The organic material 12 is then compacted about and slowly built up around the tube 84 over a period of time. In addition, to further enhance air flow throughout the chambers 16 or 18, horizontally projecting pipes 86 can be inserted through openings 88 in the sidewalls 20 with the inner ends of the pipes 84 abutting and registering with the tube 84. Within a day or two of the stack of organic material 12 being completed, the tube 84 is withdrawn and removed and the natural chimney 82 is thereby formed through the mass of compacted organic material 12. The blower or fan 40 can force air to flow in either direction—up or down—through the natural chimney 82 and through the horizontally disposed pipes 86 that are now in communication with the natural chimney 82 and which are now covered through the gradual build up of the stack of organic material 12. FIG. 18 illustrates the process of placing the tube 84 within the respective chamber 16 or 18, and FIG. 19 illustrates the withdrawal of the tube 84 and the formation of the natural chimney 82 vertically extending through the organic material 12. Moreover, as shown in FIG. 5, the natural chimneys 82 are in alignment with each other when the composting units 14 are disposed in a stacked configuration, and thus positive or negative air flow can be maintained throughout the chambers 16 and 18 of the stacked composting units 14.

Figure 1:
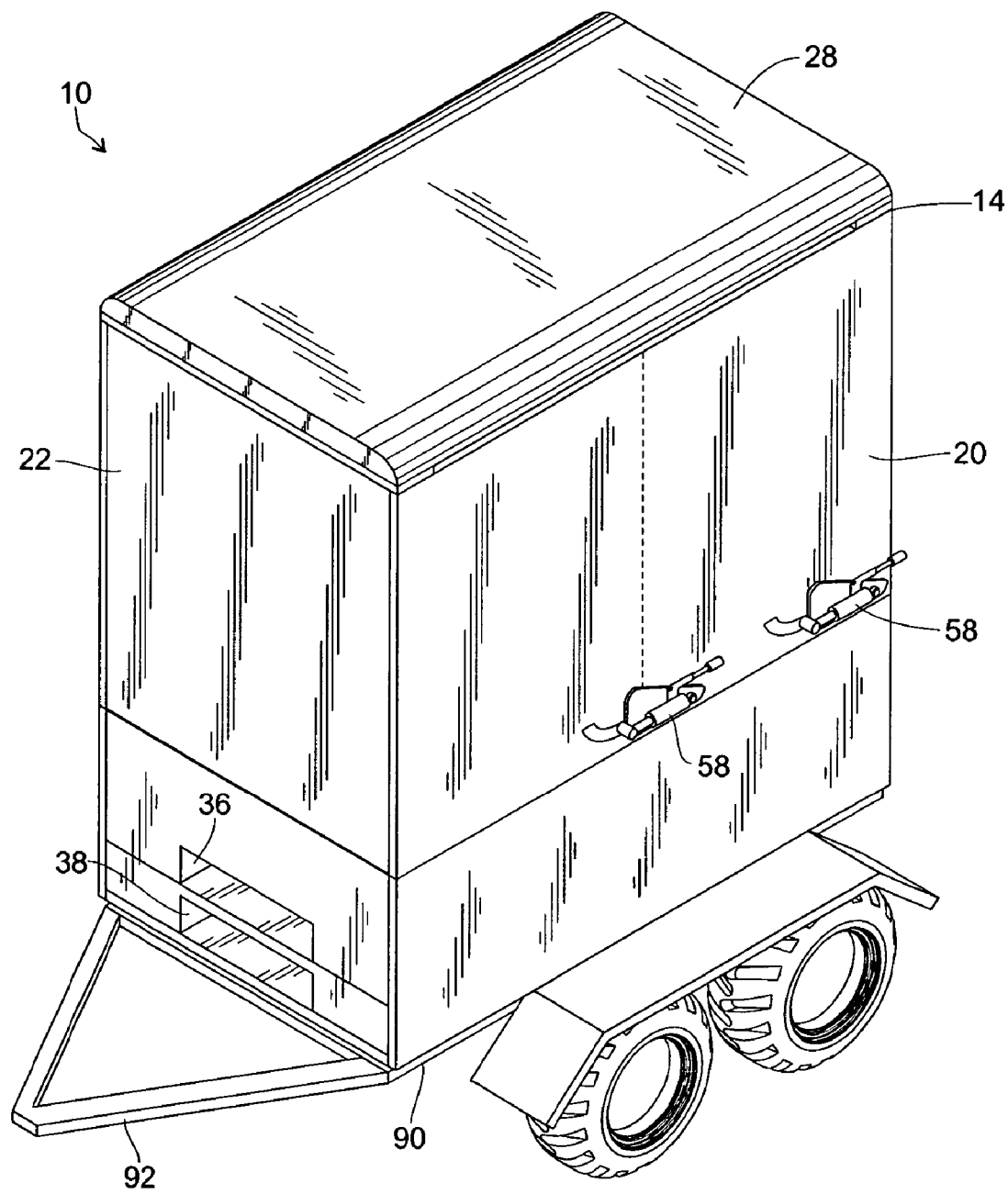
FIG. 1 is a perspective view of the mobile, modular multi-chamber composting system of the present invention showing one composting system mounted on a towable trailer hitch.

The composting system 10 is towable and stackable in a variety of configurations. One configuration is illustrated in FIGS. 1 and 2 wherein one composting unit 14 is disposed upon a two-wheeled trailer 90 having a hitch bar 92 securable to a lawn tractor. The composting unit 14 of FIGS. 1 and 2 is sized for a small-sized market. FIG. 3 illustrates several composting units 14 joined together on trailers 90 and towable by a lawn tractor or a farm tractor.

Figure 4A:
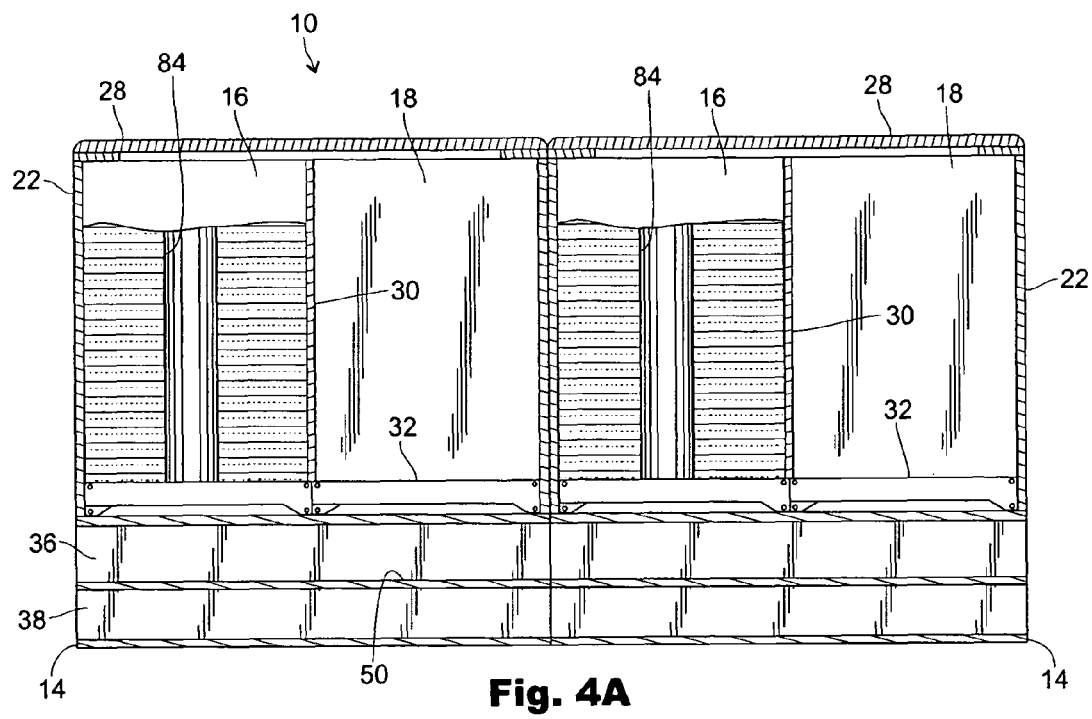
FIG. 4a is a sectioned elevational view taken along lines 4-4 of FIG. 3 of the mobile, modular multi-chamber composting system of the present invention illustrating two adjoined composting units with each unit having a tube temporarily disposed therein for creating a natural chimney within the chamber.
Figure 4B:
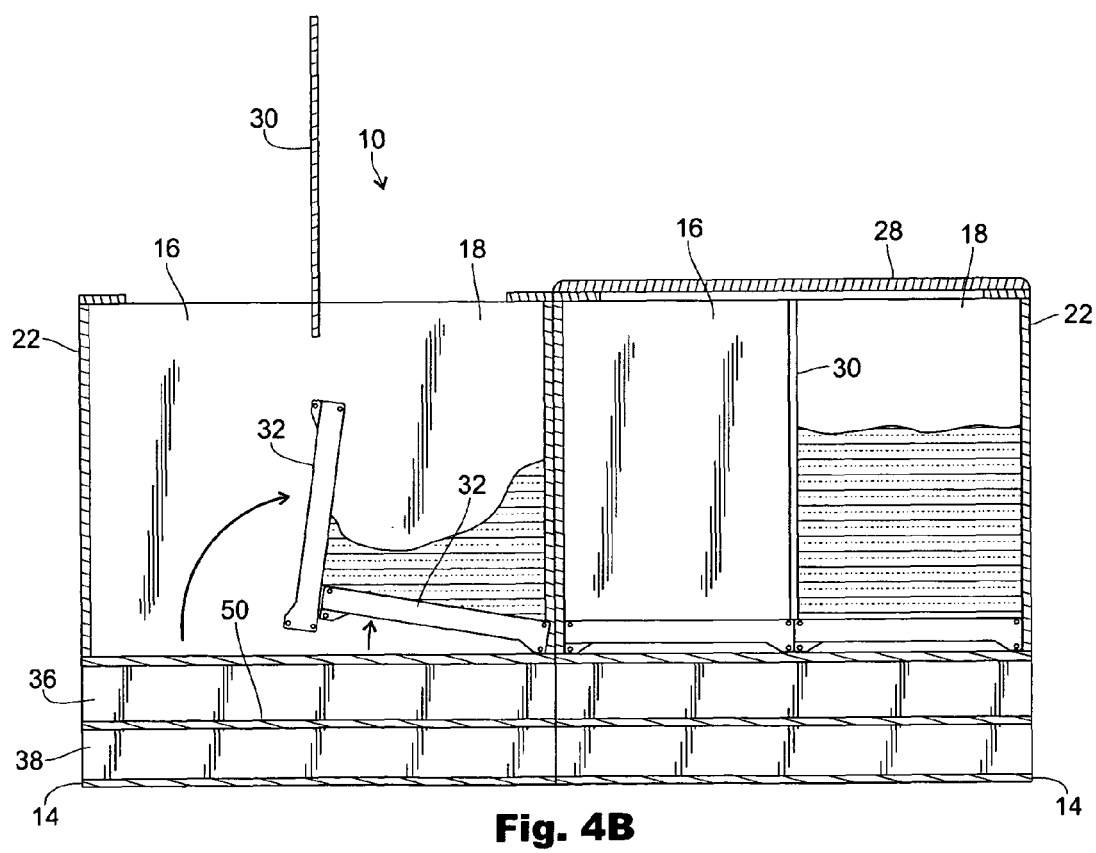
FIG. 4b is a sectioned elevational view taken along lines 4-4 of FIG. 3 of the mobile, modular multi-chamber composting system of the present invention illustrating the tilting capabilities of the first and second composting floors in one composting unit.
Figure 5:
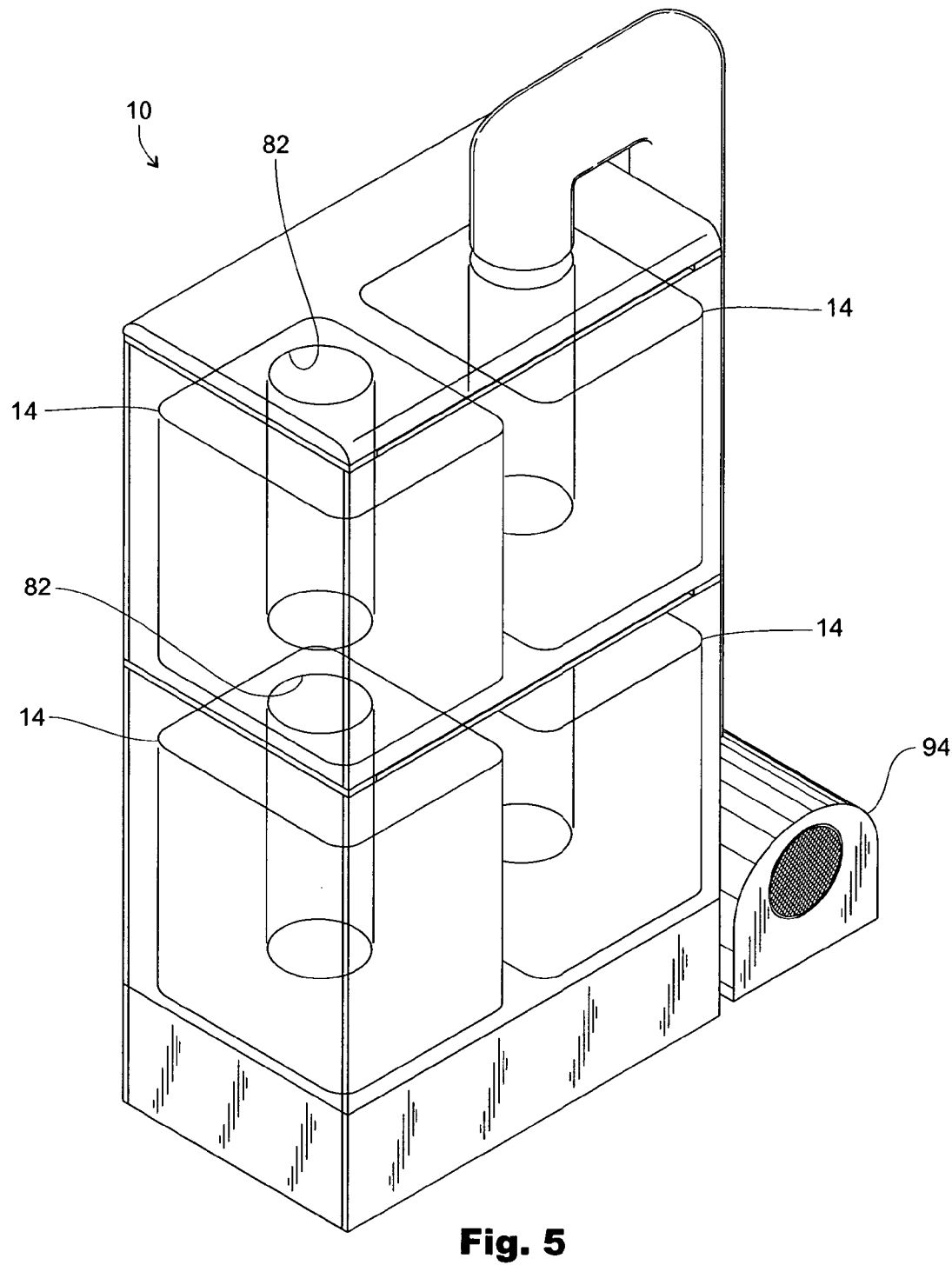
FIG. 5 is a schematic perspective view of the mobile, modular multi-chamber composting system of the present invention illustrating four composting units adjoined and in a stacked configuration, with each unit including a temporary tube for creating natural chimneys in the respective chambers after the tubes are withdrawn and a shaker adjacent the composting units for receiving organic material therefrom.
Figure 6:
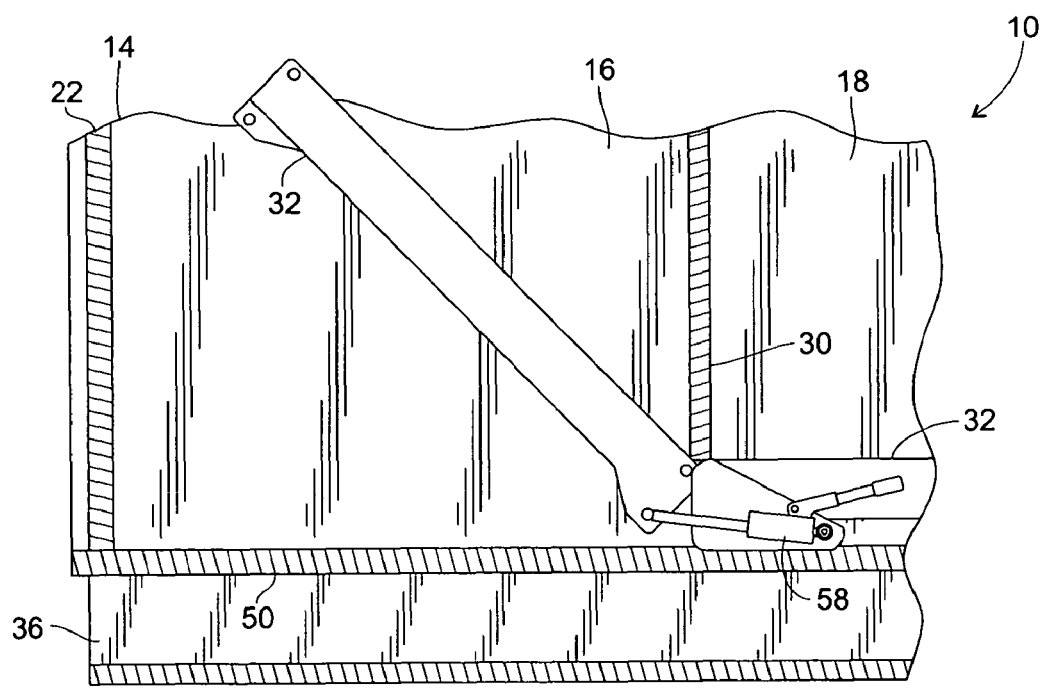
FIG. 6 is a sectioned elevational view of the mobile, modular multi-chamber composting system illustrating one embodiment for a hydraulic system for tilting the composting floor of one chamber of the unit.
Figure 7:
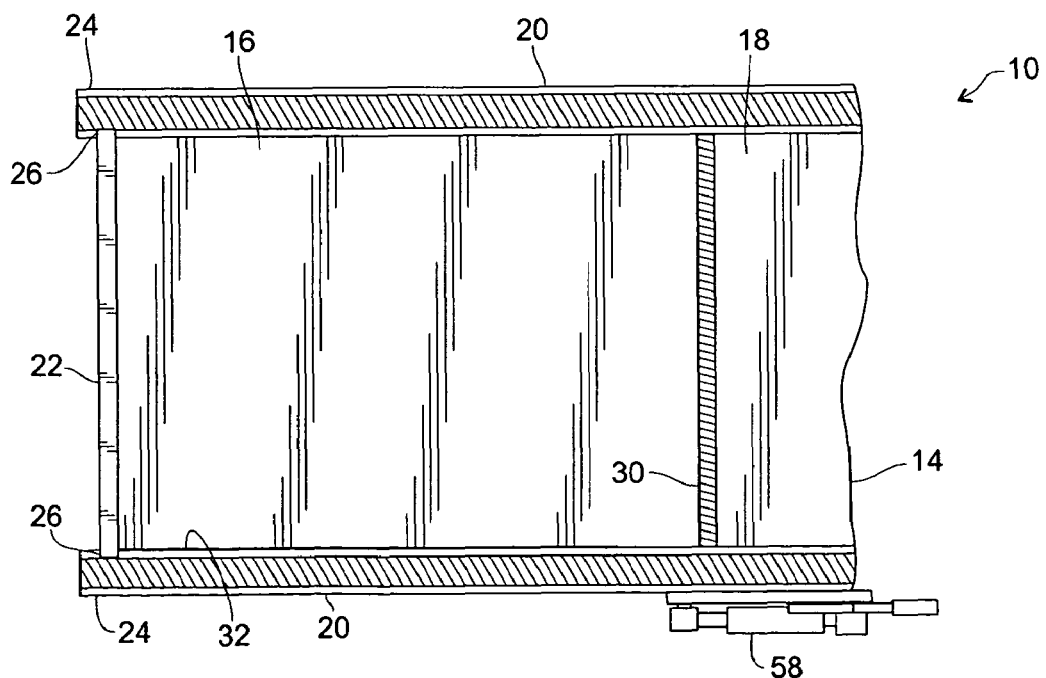
FIG. 7 is a top plan view of the mobile, modular multi-chamber composting system of the present invention illustrating the hydraulic system and the removable separation panel dividing two composting chambers of the composting unit.
Figure 8:
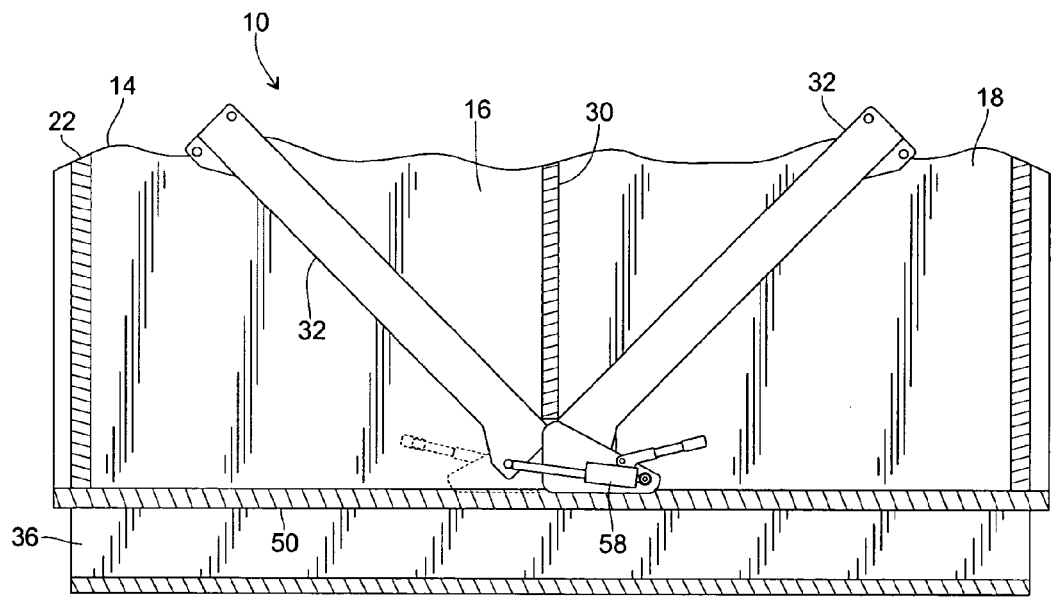
FIG. 8 is a sectioned elevational view of the mobile, modular multi-chamber composting system of the present invention illustrating the tilting capabilities of both composting floors by the hydraulic systems.
Figure 9:
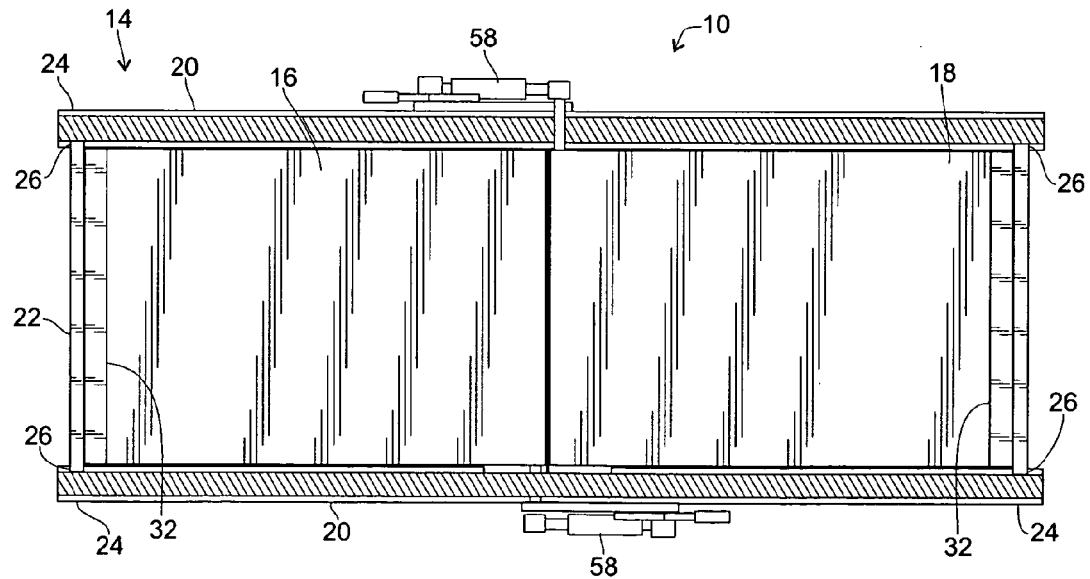
FIG. 9 is a top plan view of the mobile, modular multi-chamber composting system of the present invention illustrating the tilting of both composting floors of one composting unit.
Figure 10:
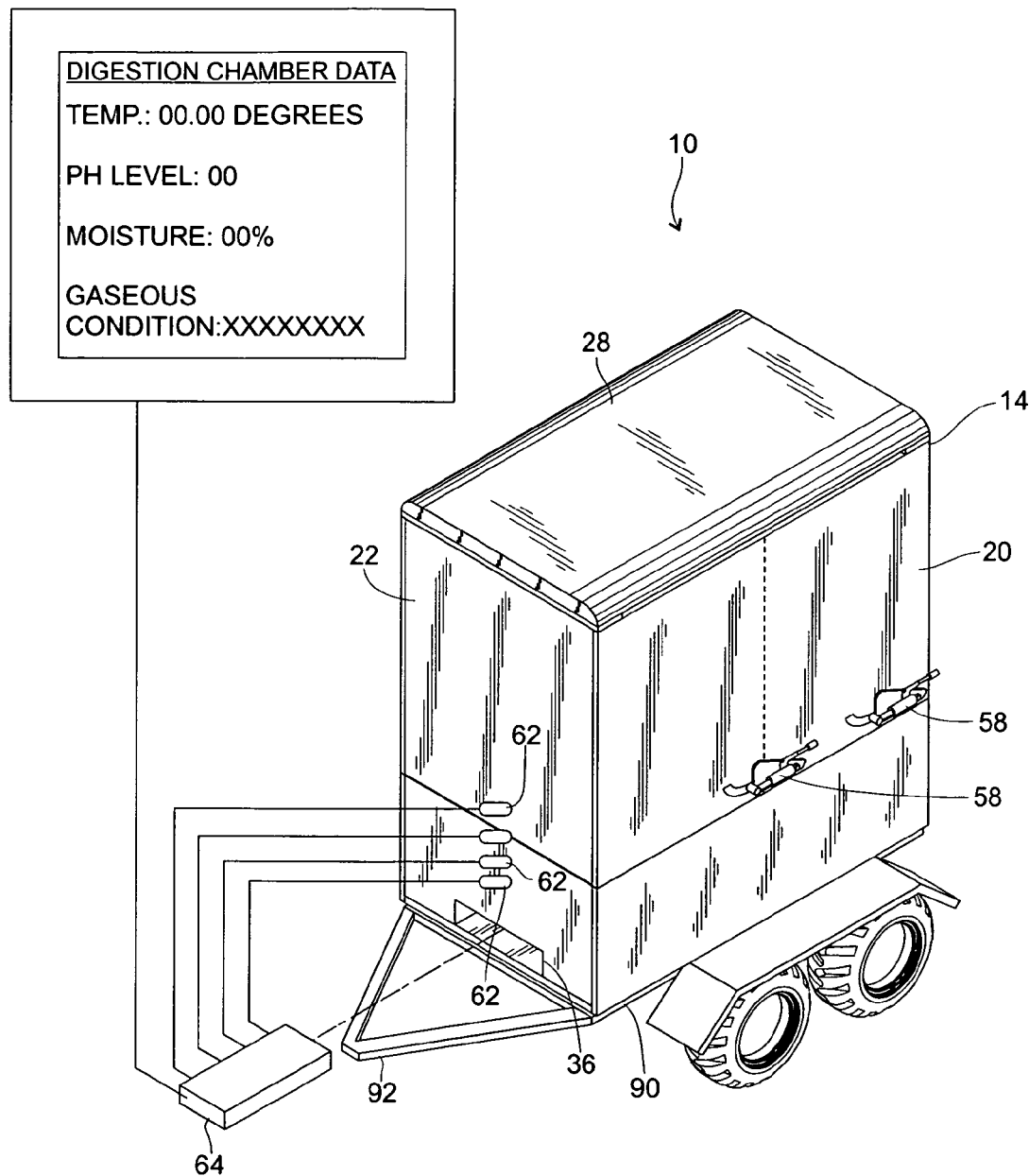
FIG. 10 is a perspective view of the mobile, modular multi-chamber composting system of the present invention illustrating the interconnection of a microprocessor with the composting chambers for monitoring certain system parameters.

FIG. 4a illustrates the placement of tubes 84 into the initial chambers 16 of two adjoined composting units 14 prior to the addition of the organic material 12 in each respective initial chamber 16 for creating natural chimneys 82 in the initial or first chambers 16 upon removal of the tubes 84. FIG. 4b illustrates the tilting of the composting floor 32 of the first chamber 16 relative to the second or adjoining chamber 18 after the removal of the separation panel 30.

FIG. 5 schematically illustrates a configuration of a pair of composting units 14 in a stacked configuration with the natural chimneys 82 of the composting units 14 being in alignment to facilitate positive or negative air flow through the chambers 16 and 18 and against the organic material 12 deposited within the chambers 16 and 18. Also, a blower/motor unit 94 is located adjacent the second or adjoining chambers 18 for maintaining and enhancing the circulation of air throughout the organic material 12. FIGS. 6-9 illustrate the hydraulic lifting mechanism 58 lifting and tilting one or both of the composting floors 32 in various orientations relative to each. This lifting and tilting of the composting floors 32 can be done independently as there is a separate hydraulic lifting mechanism 58 for each composting floor 32 although in operation only one composting floor 32 of either chamber 16 or 18 would be flipping and transferring organic material 12 at a time. It should be noted that the lifting mechanism 58 for lifting and tilting the composting floors 32 is preferably hydraulically powered, either manually driven or by automated hydraulics.

FIGS. 11-13 illustrate the various configurations for which the composting unit 14 can be adapted. It should be noted that the structural elements of the composting unit 14 would be the same in any configuration, except that the structural elements would be appropriately sized for that particular market. Thus, FIG. 11 illustrates one composting unit 14 used for a small end or small size market that could be a homeowner or for the owner of a small lawn and garden shop, flower shop, produce market. FIG. 12 illustrates one composting unit 96 sized for a middle end market that could be a tree farm, nursery or family farm. FIG. 13 illustrates one composting unit 98 sized for large-scale industrial or institutional use and being supported on a tractor-trailer 99. FIG. 14 illustrates the uni-directional movement and tilting of the composting floor 32 of the initial chamber 14 and the bi-directional movement and tilting of the composting floor 32 of the second or adjoining chamber 18. Also, FIG. 14 shows how the arms 100 of a forklift can be used to lift the composting unit 14 off of the trailer 90 or 99 for stacking on other composting units 14, 96 or 98; or, for example, placement on the bed of a pick up truck or the bed 102 of the tractor-trailer 99.

The foregoing description has been limited to specific embodiments of this invention, and it will be apparent to those skilled in the art that numerous modifications, alterations, and variations may be made to the disclosed embodiments and will come within the spirit of the embodiments and the scope of the appended claims which will cover all such modifications, alterations, and variations.

The invention claimed is:

1. A portable composting unit for decomposing organic material, comprising:
   a first initial chamber and a second adjoining chamber enclosed by a pair of opposed sidewalls and a pair of end panels with both the first and second chambers capable of holding and decomposing therein the organic material;
   a separation panel disposed between the first initial chamber and the second adjoining chamber and removably mounted to the sidewalls, the separation panel being movable to allow organic material to be transferred between the first chamber and the second chamber;
   a roof disposed upon the sidewalls and the end panels for generally closing off the first initial chamber and the second adjoining chamber;
   a first composting floor disposed within the first initial chamber;
   a second composting floor disposed within the second adjoining chamber; and
   a lifting and tilting mechanism interconnected to the first and second composting floors configured for selectively and independently raising and tilting either composting floor relative to the first and second chambers so that the organic material can be transferred between the first chamber and the second chamber or expelled from the composting unit.

2. The composting unit of claim 1 further comprising a first subjacent chamber disposed beneath both composting floors and generally extending the length of the composting floors.

3. The composting unit of claim 2 further comprising a second subjacent chamber disposed beneath the first subjacent chamber and generally coequal in length with the first subjacent chamber.

4. The composting unit of claim 3 wherein each composting floor includes an aeration aperture for allowing air to flow into each respective chamber and about the organic material.

5. The composting unit of claim 4 further comprising a blower disposed within the first subjacent chamber for directing air flow up into the respective chambers or extracting air therefrom to enhance the decomposition of the organic material.

6. The composting unit of claim 5 further comprising electronic monitoring equipment for monitoring given parameters or conditions occurring within the chambers, including ph level, moisture content, temperature, or gaseous conditions.

7. The composting unit of claim 1 wherein each composting unit is capable of being placed upon another composting unit so that respective chambers are brought into alignment thereby creating a stacked configuration of composting units.

8. A portable composting system for decomposing organic material, comprising:
- a plurality of chambers for holding and decomposing the organic material therein, each chamber including a tiltable composting floor disposed therein, said chambers being serially arranged to successively transfer the organic material from one chamber to an adjacent chamber, each chamber being separated from an adjacent chamber by a separation panel that can be moved to allow organic material to be transferred from one chamber to an adjacent chamber; and
- a lifting and tilting mechanism for selectively and independently raising and tilting the composting floor in each said chamber so that the organic material can be successively transferred from a chamber to an adjacent chamber or expelled from the composting system.

9. The composting system of claim 8 further comprising a first subjacent chamber disposed beneath said composting floors and extending generally the length of the composting floors.

10. The composting system of claim 9 further comprising a second subjacent chamber disposed beneath the first subjacent chamber and generally coequal in length with the first subjacent chamber.

11. The composting system of claim 10 wherein each composting floor includes an aeration aperture for allowing air to flow into each respective chamber and about the organic material.

12. The composting system of claim 11 further comprising a blower disposed within the first subjacent chamber for directing air flow up into the respective chambers or extracting air therefrom to enhance the decomposition of the organic material.

13. The composting system of claim 12 further comprising electronic monitoring equipment for monitoring given parameters or conditions occurring within the chambers, including ph level, moisture content, temperature, or gaseous conditions.

14. The composting system of claim 8 wherein the system is capable of being placed upon another composting system so that respective chambers of the systems are generally vertically aligned thereby creating a stacked configuration of composting systems.

15. The composting system of claim 14 further comprising a natural chimney system connecting stacked composting systems.

16. The composting system of claim 8 wherein said plurality of chambers comprises at least three chambers.

17. The composting system of claim 8 wherein each of said chambers is defined by outer walls and wherein a wall between adjacent chambers can be moved to transfer the organic material from a chamber to an adjacent chamber.

* * * * *